(12) United States Patent
Edwards et al.

(10) Patent No.: US 10,580,272 B1
(45) Date of Patent: Mar. 3, 2020

(54) TECHNIQUES TO PROVIDE AND PROCESS VIDEO DATA OF AUTOMATIC TELLER MACHINE VIDEO STREAMS TO PERFORM SUSPICIOUS ACTIVITY DETECTION

(71) Applicant: Capital One Services, LLC, McLean, VA (US)

(72) Inventors: Joshua Edwards, Philadelphia, PA (US); Michael Mossoba, Arlington, VA (US); Abdelkader M'Hamed Benkreira, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/151,969

(22) Filed: Oct. 4, 2018

(51) Int. Cl.
| | |
|---|---|
| *H04N 5/00* | (2011.01) |
| *G08B 13/196* | (2006.01) |
| *G06K 9/00* | (2006.01) |
| *G06T 5/00* | (2006.01) |
| *G06K 9/32* | (2006.01) |
| *H04N 5/44* | (2011.01) |
| *H04N 7/08* | (2006.01) |
| *G06Q 20/10* | (2012.01) |
| *H04N 5/247* | (2006.01) |

(52) U.S. Cl.
CPC ... *G08B 13/19686* (2013.01); *G06K 9/00228* (2013.01); *G06K 9/00711* (2013.01); *G06K 9/00771* (2013.01); *G06K 9/3258* (2013.01); *G06T 5/002* (2013.01); *H04N 5/44* (2013.01); *H04N 7/0806* (2013.01); *G06Q 20/1085* (2013.01); *G06T 2207/10016* (2013.01); *G06T 2207/30201* (2013.01); *G06T 2207/30232* (2013.01); *H04N 5/247* (2013.01)

(58) Field of Classification Search
CPC ... B25J 13/00; B25J 9/16; B25J 13/086; B25J 13/006; B25J 9/1697; B25J 9/1694; B25J 11/002; B25J 19/023; B25J 5/007; G01V 8/10; G05D 1/00; G05D 1/02; G05D 1/0212; G05D 1/0094; G05D 1/0022; G05D 1/0044; G05D 1/0274; G05D 2201/0209; G06K 7/10297; G06K 19/14; G08B 13/2491; G08B 13/196; Y10S 901/01; Y10S 901/46; G05B 2219/45103
See application file for complete search history.

(56) References Cited

U.S. PATENT DOCUMENTS

2008/0274798 A1* 11/2008 Walker ............... G07F 17/32
463/25
2014/0176663 A1* 6/2014 Cutler ............... G06T 7/50
348/14.07

(Continued)

*Primary Examiner* — Frank F Huang

(57) ABSTRACT

Various embodiments are generally directed to techniques for receiving first video data comprising one or more frames having a scene with a person and perform a facial detection process on the first video data to detect a facial region in each frame having the scene with the person. Embodiments also include generating second video data from the first video data, the second video data to include a blurring effect applied to the facial region detected in the first video data, providing the second video data for display on one or more devices, and receiving a tag indication from at least one of the one or more devices, the tag indication to indicate a portion of the second video data having suspicious activity.

15 Claims, 12 Drawing Sheets

(56) References Cited

U.S. PATENT DOCUMENTS

| | | | |
|---|---|---|---|
| 2015/0347859 A1* | 12/2015 | Dixon | G06K 9/186 |
| | | | 382/138 |
| 2016/0014346 A1* | 1/2016 | Kobayashi | H04N 7/181 |
| | | | 348/159 |
| 2016/0165136 A1* | 6/2016 | Mitsui | H04N 21/4524 |
| | | | 348/36 |
| 2016/0350826 A1* | 12/2016 | Glasgow | G06F 16/58 |
| 2017/0225336 A1* | 8/2017 | Deyle | B25J 13/086 |
| 2017/0289504 A1* | 10/2017 | Fridental | G06K 9/00765 |
| 2018/0061010 A1* | 3/2018 | Akselrod | G06T 5/002 |
| 2018/0068540 A1* | 3/2018 | Romanenko | G06K 9/3233 |
| 2018/0158220 A1* | 6/2018 | Van Eeuwijk | G06F 16/5854 |
| 2018/0234847 A1* | 8/2018 | Rodriguez | H04M 1/7253 |
| 2018/0268240 A1* | 9/2018 | Loce | H04N 5/77 |
| 2019/0050592 A1* | 2/2019 | Grau | G06F 21/6245 |
| 2019/0068895 A1* | 2/2019 | Hutz | H04N 5/2621 |

\* cited by examiner

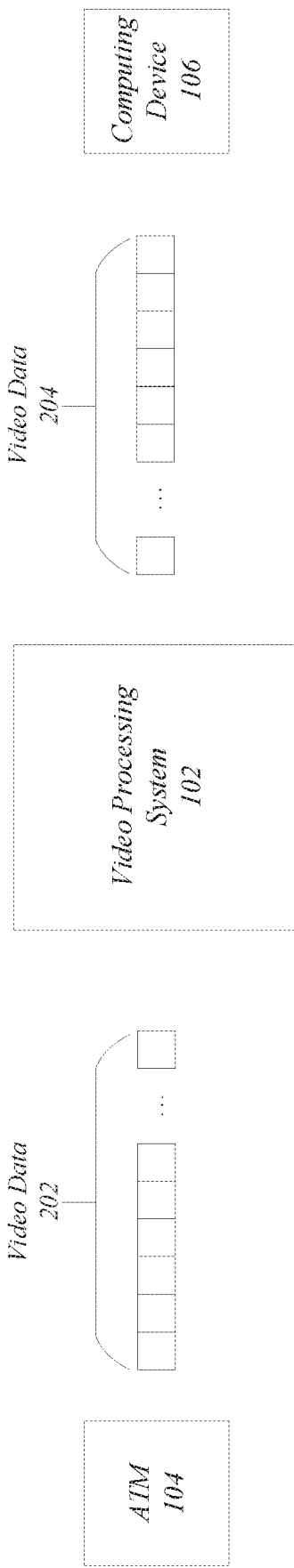

400

RECEIVE FIRST VIDEO DATA COMPRISING ONE OR MORE FRAMES HAVING A SCENE WITH A PERSON
405

PERFORM A FACIAL DETECTION PROCESS ON THE FIRST VIDEO DATA TO DETECT A FACIAL REGION IN EACH FRAME HAVING THE SCENE WITH THE PERSON
410

GENERATE SECOND VIDEO DATA FROM THE FIRST VIDEO DATA, THE SECOND VIDEO DATA TO INCLUDE A BLURRING EFFECT APPLIED TO THE FACIAL REGION DETECTED IN THE FIRST VIDEO DATA
415

PROVIDE THE SECOND VIDEO DATA FOR DISPLAY ON ONE OR MORE DEVICES
420

RECEIVE A TAG INDICATION FROM AT LEAST ONE OF THE ONE OR MORE DEVICES, THE TAG INDICATION TO INDICATE A PORTION OF THE SECOND VIDEO DATA HAVING SUSPICIOUS ACTIVITY
425

```
┌─────────────────────────────────────────────┐
│  RECEIVE VIDEO DATA STREAMS FROM A PLURALITY OF │
│     AUTOMATIC TELLER MACHINES (ATMS)        │
│                   455                       │
└─────────────────────────────────────────────┘
                      │
┌─────────────────────────────────────────────┐
│  DETECT REGIONS SURROUND FACES OF PEOPLE WITHIN │
│  EACH OF THE VIDEO DATA STREAMS BY PERFORMING A │
│   FACIAL DETECTION PROCESS ON EACH OF THE VIDEO │
│                DATA STREAMS                 │
│                   460                       │
└─────────────────────────────────────────────┘
                      │
┌─────────────────────────────────────────────┐
│     GENERATE NEW VIDEO DATA STREAMS EACH    │
│  CORRESPONDING TO ONE OF THE VIDEO DATA STREAMS │
│   RECEIVED FROM THE ATMS, EACH OF THE NEW VIDEO │
│  DATA STREAMS TO INCLUDE A BLURRING EFFECT APPLIED │
│              TO DETECTED REGIONS            │
│                   465                       │
└─────────────────────────────────────────────┘
                      │
┌─────────────────────────────────────────────┐
│ PROVIDE AT LEAST ONE OF THE NEW VIDEO DATA STREAMS │
│     FOR DISPLAY ON ONE OR MORE DEVICES      │
│                   470                       │
└─────────────────────────────────────────────┘
                      │
┌─────────────────────────────────────────────┐
│   RECEIVE A TAG INDICATION FROM AT LEAST ONE OF THE │
│  ONE OR MORE DEVICES, THE TAG INDICATION TO INDICATE │
│   A PORTION OF ONE OF THE NEW VIDEO DATA STREAMS │
│            HAVING SUSPICIOUS ACTIVITY       │
│                   475                       │
└─────────────────────────────────────────────┘
                      │
┌─────────────────────────────────────────────┐
│   SEND A PORTION OF A VIDEO DATA STREAM OF THE VIDEO │
│    DATA STREAMS CORRESPONDING WITH THE INDICATED │
│   PORTION OF THE ONE OF THE NEW VIDEO DATA STREAMS │
│          TO AN EMERGENCY SERVICES SYSTEM    │
│                   480                       │
└─────────────────────────────────────────────┘
```

TECHNIQUES TO PROVIDE AND PROCESS VIDEO DATA OF AUTOMATIC TELLER MACHINE VIDEO STREAMS TO PERFORM SUSPICIOUS ACTIVITY DETECTION

BACKGROUND

Automatic teller machines (ATMs) are seemly everywhere nowadays. They are on many street corners in large cities and small/rural towns. The ATMs typically enable a user to perform one or more transactions with financial institutions. The ATMs also include one or more security components, such as cameras to record users performing transaction. In some instances, these cameras may capture a user performing a transaction and the surrounding area, for example. However, the video from these cameras are typically only used to protect the ATMs themselves and are underutilized.

SUMMARY

Various embodiments described herein may include a device, a system, and an apparatus, and so forth including a memory to store instructions, and processing circuitry, coupled with the memory. The processing circuitry is operable to execute the instructions, that when executed, cause the processing circuitry to receive first video data comprising one or more frames having a scene with a person, perform a facial detection process on the first video data to detect a facial region in each frame having the scene with the person, generate second video data from the first video data, the second video data to include a blurring effect applied to the facial region detected in the first video data, and provide the second video data for display on one or more devices. In embodiments, the processing circuitry to receive a tag indication from at least one of the one or more devices, the tag indication to indicate a portion of the second video data having suspicious activity.

Various embodiments also include a computer-implemented method, including receiving, via one or more networking links, video data from an ATM, the video data comprising one or more frames having a scene with a person, performing, by processing circuitry, a facial detection process on the video data to detect a region surrounding a face of a person in each frame having the scene with the person, generating, by the processing circuitry, new video data from the video data by replicating the video data and applying a blurring effect to the region surrounding the face of the person detected in the video data, sending, by the processing circuitry via the one or more networking links, the new video data to one or more devices. The method also includes receiving, by the processing circuitry via the one or more network links, a tag indication from at least one of the one or more devices, the tag indication to indicate a portion of the new video data having suspicious activity.

Embodiments, as discussed herein, also include A computer-readable storage medium storing computer-readable program code executable by a processor to receive video data streams from a plurality of automatic teller machines (ATMs), detect regions surround faces of people within each of the video data streams by performing a facial detection process on each of the video data streams, generate new video data streams each corresponding to one of the video data streams received from the ATMs, each of the new video data streams to include a blurring effect applied to detected regions, and provide at least one of the new video data streams for display on one or more devices. The processor may also receive a tag indication from at least one of the one or more devices, the tag indication to indicate a portion of one of the new video data streams having suspicious activity, and send a portion of a video data stream of the video data streams corresponding with the indicated portion of the one of the new video data streams to an emergency services system.

BRIEF DESCRIPTION OF THE DRAWINGS

FIGS. 2A-2C illustrates examples of processing video data.

FIG. 4A/4B illustrate examples of processing flows for processing video data in a financial system.

DETAILED DESCRIPTION

Figure 1:
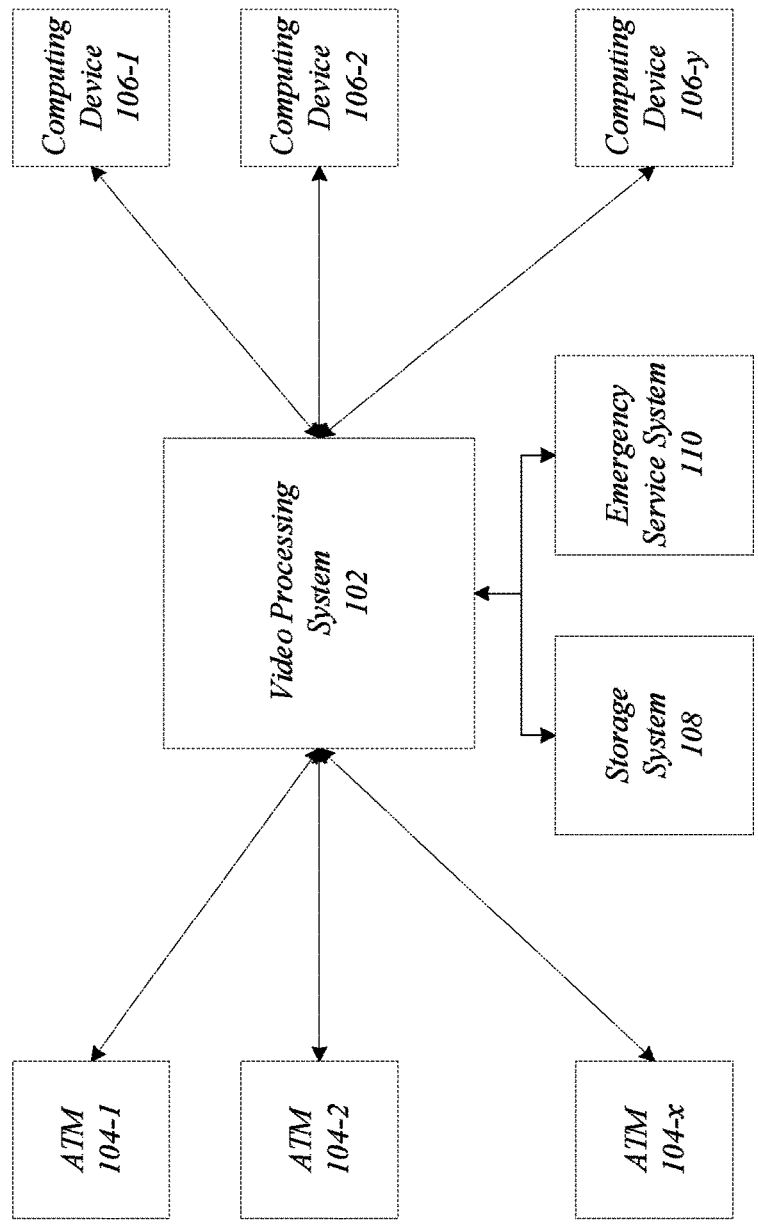
FIG. 1 illustrates an example of a financial system to process video data and information.

Various embodiments are generally directed to providing video feeds from ATMs cameras to be viewed by one or more users via computing devices. Embodiments include receiving video data and processing the video data to ensure privacy for the people and objects in the video data. More specifically, a video processing system may receive a camera feed, recognize faces and objects, and blur them out for privacy. The blurred-out video stream is then made available for other users to view and watch for suspicious activity. The blurred video stream can be provided live, e.g., in real-time or near real-time, or a user can review older blurred video feed by using a rewind function.

In embodiments, a user may generate a tag when they witness suspicious activity while watching the video stream. For example, a user may generate a tag via an input device on the computing device. The tag indication may note a spot or portion of the video having the suspicious activity, e.g., a timestamp or a frame number may be saved. The tag indication may be provided back to a video processing system, and the video processing system may determine corresponding raw or original video data based on the tag indication. The video processing system may send the original video data to an emergency services system, e.g., a police system, such that the police may use the video to investigate the suspicious activity. Embodiments are not limited to the above example, and additional details will become apparent in the following description.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example of a financial system 100 that is capable of processing information and data relating to automatic teller machines (ATM) including, but not limited to, video data captured by one or more video cameras of one or more ATMs. In one example, the financial system 100 may including a video processing system 102 capable of receiving video data from a plurality of ATMs, processing the video data to ensure privacy of ATM users and others in the scene, and provide the video data to computing devices such that a user may be able to watch a video stream and tag suspicious activity. These and other details will become more apparent in the following description.

In embodiments, the financial system 100 may include a number of components, systems, devices, and so forth to process information and data. In one example, the financial system 100 may include one or more ATMs 104-$x$, where $x$ may be any positive integer. The ATMs 104 can perform transaction processing including receiving deposits, dispensing cash, providing account balances, and so forth. Each of the ATMs 104 may include one or more cameras capable of capturing video data of a scene or an area around the ATM 104, e.g., in the camera's field of vision.

In embodiments, the financial system 100 may also include a video processing system 102 capable of processing video data received from ATMs 104. The video processing system 102 may include processing circuitry and memory and is coupled with one or more networking links, which may include wired and wireless networking links. The video processing system 102 may receive video data from the ATMs 104 in a secure manner, e.g., encrypted, secure tunnel, and so forth.

The video processing system 102 processes information and data and performs a number of operations, such as performing object detection operations (facial recognition, text recognition, object edge detection, etc.). The video processing system 102 may also apply blurring effects to detected objects and faces and generate new video data with the applied blurring effects to send to one or more computing devices 106. For example, the video processing system 102 may apply blurring effects to personally identifiable information (PII) or sensitive personal information (SPI), e.g., information kept confidential due to banking regulations, privacy laws, and so forth. The PII may be information that can be used on its own or with other information to identify, contact, or locate a single person, or to identify an individual in context, e.g., name, face, address, email address, social security number (national identification number), passport number, vehicle registration plate number, driver's license number, biometrics, data of birth, birthplace, genetic information, telephone number, login screen, and so forth.

In embodiments, the financial system 100 including the video processing system 102 may receive and process tag indications from one or more computing devices 106. The tag indications may indicate that a user detected suspicious activity in video data provided to the computing device 106. The video processing system 102 may utilize the tag indication to determine at least a portion of raw (unblurred) video data to send to an emergency services system 110. In embodiments, the size of the portion may be configurable by a user or the video processing system 102. For example, the video processing system 102 may send a one/five/ten minute portion of the raw video data to the emergency services system 110. The emergency services system 110 may dispatch or cause a dispatch of emergency personnel, e.g., police, to a location of an ATM where the suspicious activity is detected.

In some embodiments, the video processing system 102 may apply crowdsourcing techniques to determine which portions of video data may be elevated and sent to an emergency services system 110. For example, the video processing system 102 receive a plurality of tag identifications from a plurality of devices and determine a number of the plurality of tag identifications received. If the number of received tag indications is greater than a first threshold value, the video processing system 102 may send the tagged portion of video data to one or more other or additional devices to receive additional feedback and tag indications. For example, users of the additional devices may provide further input and tag the portion as being suspicious or they may indicate that the portion is not suspicious. Note that the first threshold value may be user configurable and/or preset by the video processing system 102. Also note, that embodiments may include alternative or different logic, e.g., the video processing system 102 may send the portion to the additional devices when the number of tag indications received is less than the first threshold value.

In some embodiments, the video processing system 102 may determine whether the number of received tag indications is greater than a second threshold value and send the portion of the one of the new video data streams to the emergency services system. In some instances, the second threshold value may be greater than the first threshold value, but embodiments are not limited in this manner. The second threshold value may also be configurable by a user of the video processing system 102 and/or set by the video processing system 102.

The video processing system 102 may be coupled with a storage system 108, which may include data structures, such as one or more databases, to store information and data including the video data. In embodiments, the video processing system 102 may be coupled with the storage system 108 via one or more wired and/or wireless networking links. In some embodiments, the storage system 108 may be local to the video processing system 102 or in a different location. Further, the storage system 108 may be part of the video processing system 102, e.g., within the same device(s). Embodiments are not limited in this manner.

In embodiments, the video processing system 102 may also be coupled with the emergency service system 110 and the computing device(s) 106-$y$, where $y$ may be any positive integer, via one or more wired and/or wireless networking links. The emergency service system 110 may include a number of components, devices, systems, etc. to process video data including a portion of video data having suspicious activity. Further, the computing devices 106 may be any type of computing device 106 including, but not limited to, a mobile device including an application (app) or web browser to present video, a personal computer (PC) having an app or web browser to present video. The computing devices 106 also includes one or more input devices capable of receiving a selection or tag indication from a user when suspicious activity is detected.

Figure 2B:
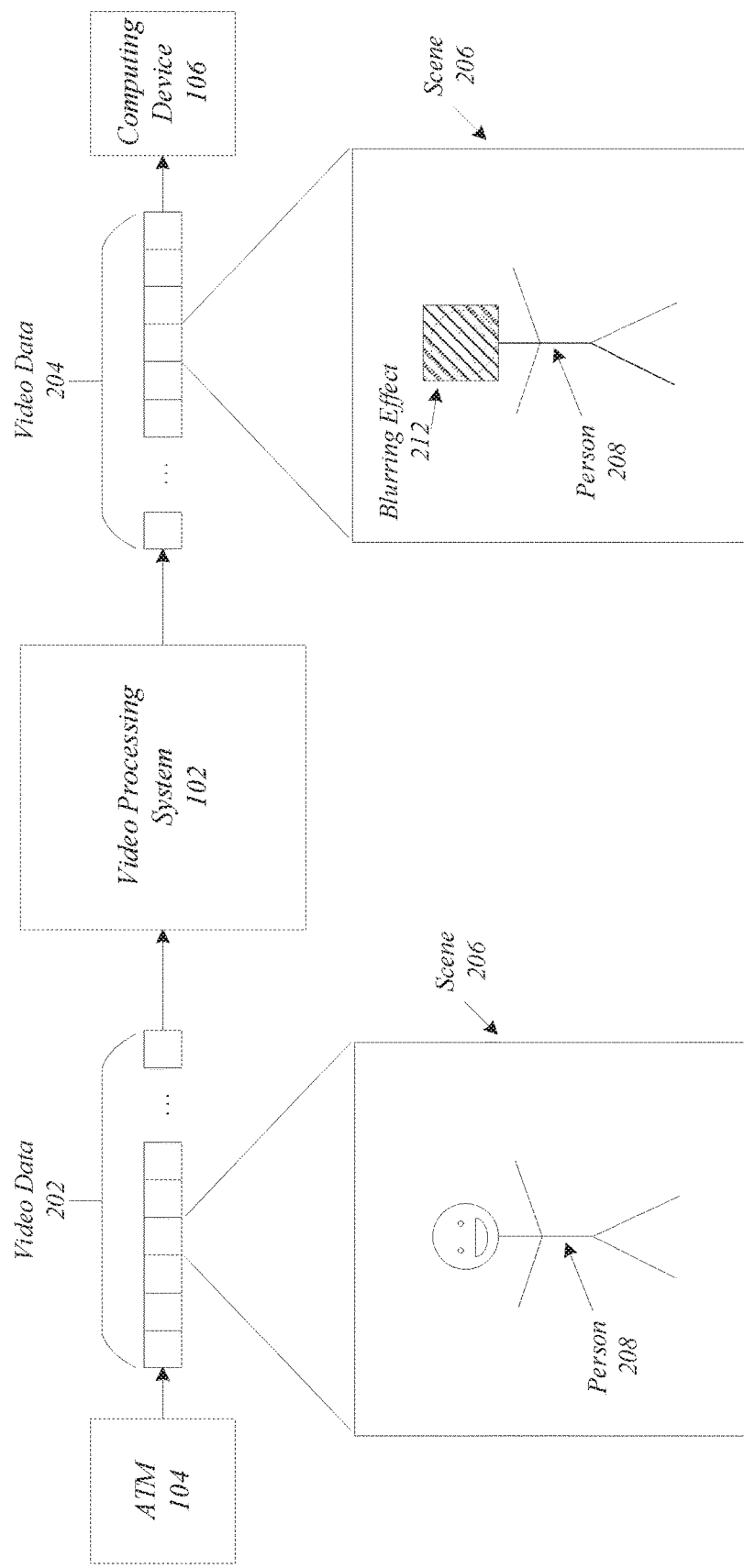
Figure 2C:
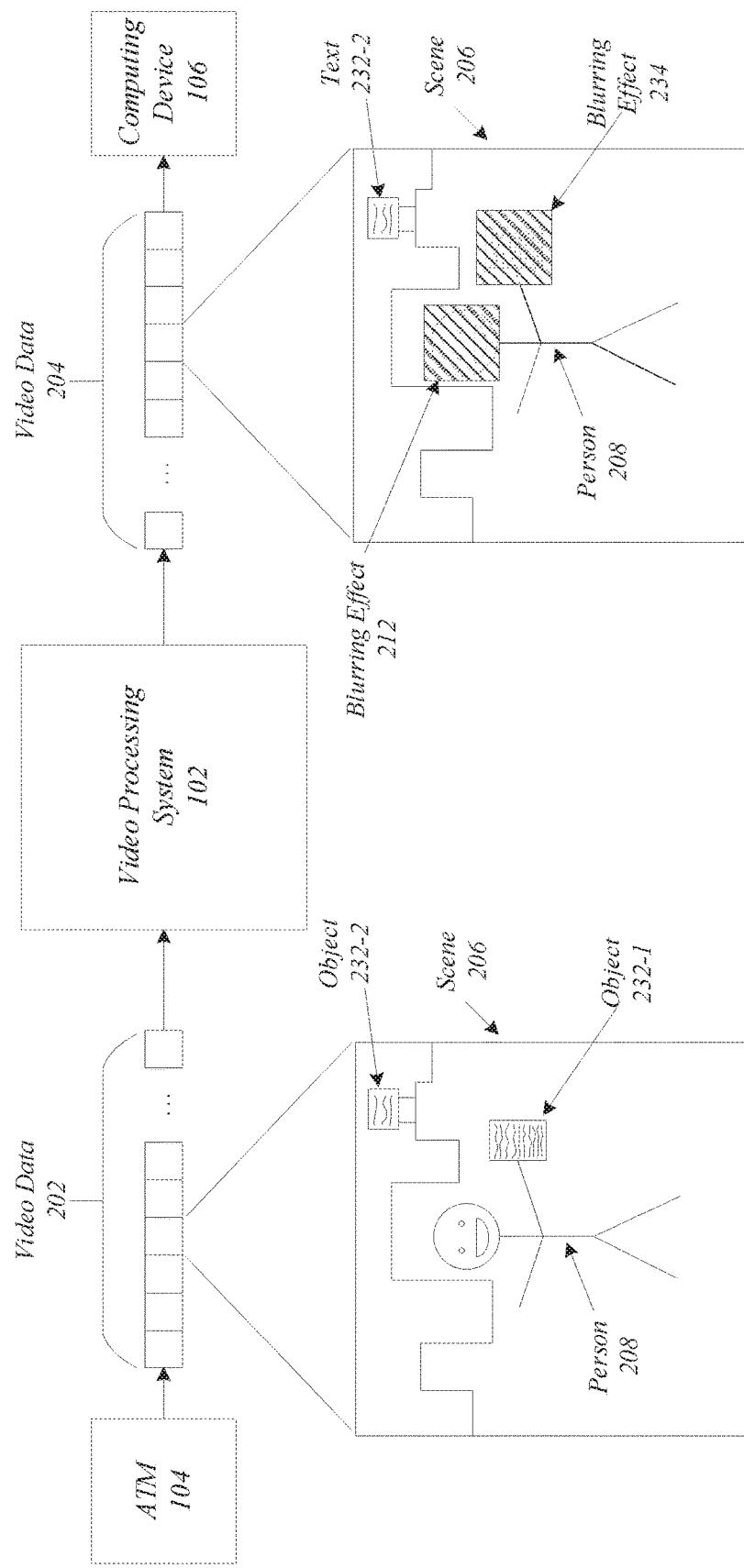

FIGS. 2A-2C illustrate an example of a processing flow 200 for processing video data by a video processing system 102. As mentioned, the video processing system 102 may be coupled with an ATM 104 and a computing device 106 via one or more networking links.

The ATM 104 including a camera may capture video data 202 including frames and send the video data 202 to the video processing system 102. The video processing system 102 may receive the video data 202 and perform one or more operations on the video data 202 to enable the video data 202 to be provided to computing device 106 as new video data 204. The video data 204 may be a duplicate of video data 202 having one or more effects applied. For example, the video processing system 102 may apply one or more blurring effects to objects in a scene 206.

As illustrated in FIG. 2B, the video data 202 may include a number of frames each having a scene 206 that is captured by a camera of the ATM 104. The video data 202 including the frames may be a video stream capturing the scene 206. The video stream including the video data 202 may be a continuous camera feed, for example, and include activity that is captured by the camera of the ATM 104. In one example, the ATM 104 may capture a person 208 interacting with the ATM 104 and/or generally acting in an area of a field of vision of the camera of the ATM 104.

The ATM 104 provides, and the video processing system 102 receives the video data 202 as a video stream and processes the video such that it may be made available to others while preserving the privacy of people and other information, e.g., credit/debit card numbers, social security numbers, etc., within scene 206. For example, the video processing system 102 may apply a facial detection process (object-class detection) on the video data 202 to determine and detect a facial region of the person 208 in each frame having the scene 206 of the video data 202. In embodiments, the video processing system 102 may apply any number of facial detection techniques to detect the face of the person 208 and the facial region, e.g., image-based facial algorithms, video-based facial algorithms, facial motion capture algorithms (Kanade-Lucas-Tomasi (KLT) algorithm), feature based (markerless) algorithms, and so forth. In one usage example, the video processing system 102 may apply a facial motion capture algorithm to locate and "lock-on" to the facial region of the person 208 while they are in the scene 206.

In embodiments, the video processing system 102 may utilize the facial detection technique to apply one or more blurring effects to the video data 202 and generate new or second video data 204. More specifically, the video processing system 102 may apply the blurring effect to the facial region detected by the facial detection technique. FIG. 2B illustrates a blurring effect 212 applied to the facial region of the person 208 in the scene 206. Continuing with the above example, the video processing system 102 may utilize the facial motion capture algorithm or similar algorithm to track the facial region of the person 208 and apply the blurring effect 212 and generate the video data 204. Thus, the blurring effect 212 may move around with the person's facial region as it is being tracked by the video processing system 102 in the video data 202 and applied to the video data 204.

The video processing system 102 may apply any number of blurring effect 212 to the video data 204, including but not limited to, a video transform algorithm, a Gaussian blur algorithm (convolution), a Kawase Bloom blur algorithm, a compute shader algorithm, an encryption blur algorithm, and so forth. In some instances, the video processing system 102 may apply a solid colored box as the blurring effect 212 to the video data 204 around the detected region. Moreover, the video processing system 102 can perform the detection operations and apply the blurring effects in real-time or near real-time, e.g., as the video data 202 is received from the ATM 104.

The video processing system 102 can also store the video data 202 and the new or second video data 204 in storage system 108 for future retrieval. In embodiments, the video data 202 and new video data 204 is stored with corresponding timestamps or frame identifiers such that a same point of time of video data 202 aligns with a same point of time of video data 204. Thus, when a tag is received, the video processing system 102 may retrieve the corresponding original video data 202. The tag can include a timestamp or frame identifier of the video data 204 corresponding to a time (or shortly before) when a user initiated the tag, for example, and be used to retrieve the corresponding video data 202.

Moreover, the video processing system 102 provides (or makes available) the video data 204 to one or more other computing devices 106 such that a user of the computing device 106 may view the video data 204 in real-time or near real-time on the computing device 106 or a display device coupled with the computing device 106. In embodiments, a user of a computing device 106 may be able to perform one or more actions with the video 204 including fast forwarding, rewinding, pausing, saving, and so forth.

In some instances, the video processing system 102 may make available and/or provide the video data 204 for viewing within a defined location of an ATM 104. For example, the video processing system 102 may send and/or make available the video data 204 to computing devices 106 within two miles of a specific ATM 104. The video processing system 102 may know or determine the location of the ATM 104 based on previously provided location data, an internet protocol (IP) address of the ATM 104, global position system (GPS) location information from the ATM 104, and/or general location information from the ATM 104. Similarly, the video processing system 102 may determine a location of a computing device 106 requesting and/or attempting to access the video data 104, e.g. based on GPS, IP address, provided by the computing device 106, and so forth. The video processing system 104 may only send the video data 204 if the computing device 106 is within a predefined distance. Moreover, the predefined distance may be set by a user and/or a device of the video processing system 104. In some instances, the predefined distance may be based on a density of ATMs within a location, e.g., more dense areas will have a smaller area or lower predefined distances, and vice-versa. Embodiments are not limited in this manner.

In embodiments, the user may be enabled to tag at least a portion of the video data 204 if they sense or determine that suspicious activity is occurring. The tag may include, touching a touchscreen display device, clicking a mouse input button, activating a displayed button in a display device. The computing device 106 may determine a time or frame associated with the tag and provide the information back to the video processing system 102. As mentioned, the tag may be a timestamp or frame identifier corresponding to when the user initiated the tag or a time shortly before the initiation. Embodiments are not limited in this manner.

In some instances, the video processing system 102 may enable additional privacy protection for objects in a scene 206. FIG. 2C illustrates processing flow 200 including the application of blurring effects 234 to at least one object 232 in the scene 206. In some instances, it may be desirable to hide text and other information such as alphanumeric information associated with the person 208 or another person in the scene 206. For example, the video processing system 102 may apply a blurring effect 234 to an object 232-1 associated with the person 208. The object 232-1 may be a credit/debit card, for example, and the video processing system 102 may blur the alphanumeric information on the face of the credit card. In another example, the video processing system 102 may identify a mobile device and blur the mobile device. In a third example, the video processing system 102 may detect or identify a document in the scene 206 and apply a blurring effect. Embodiments are not limited in this manner.

In embodiments, the video processing system 102 can apply any object detection technique to determine which objects 232 in a scene 206 to apply a blurring effect and which objects 232 to not apply a blurring effect. For example, the video processing system 102 may identify a person 208 in the scene 206 and determine an object 232-1 associated with the person 208. The detection may be based on an object detection technique, such as edge detection, text detection, shape detection, motion detection between frames, based on whether the object is in the foreground or background, and so forth. In the illustrated example, the video processing system 102 detects object 232-1 in video data 202 and applies a blurring effect 234 to the object 232-1 to provide privacy protection.

In some embodiments, it may be desirable to not blur out specific objects and text in the scene 206. The video processing system 102 can apply additional processing and identifying techniques to learn additional information about each of the objects 232 detected in a scene 206. For example, the video processing system 102 can apply optical character recognition (OCR) techniques to 'read' text on objects 232 and apply modeling techniques and/or machine-learning techniques to determine whether the text is confidential, e.g., credit/debit card numbers, personal identifying information, social security numbers, and so forth. In one specific example, the video processing system 102 may determine text using OCR techniques and use a model trained on historical data to determine and/or provide context for the text. In another example, the video processing system 102 may apply machine-learning techniques to provide context for text in the scene 206. Thus, as previously mentioned, the video processing system 102 may determine object 232-1 is a credit/debit card and apply blurring effect 234 to protect the information being shared with others. In another example, the video processing system 102 may detect object 232-2 and determine the object 232-2 includes text/information associated with an advertisement. In this example, the video processing system 102 will not apply a blurring effect to the object 232-2 as it may be desirable to have the user see the information of the object 232-2. In embodiments, the video processing system 102 may apply object detection to objects 232 that are static, not in motion, and dynamic, in motion, in the video data 202. Embodiments are not limited to above-discussed examples.

Figure 3:
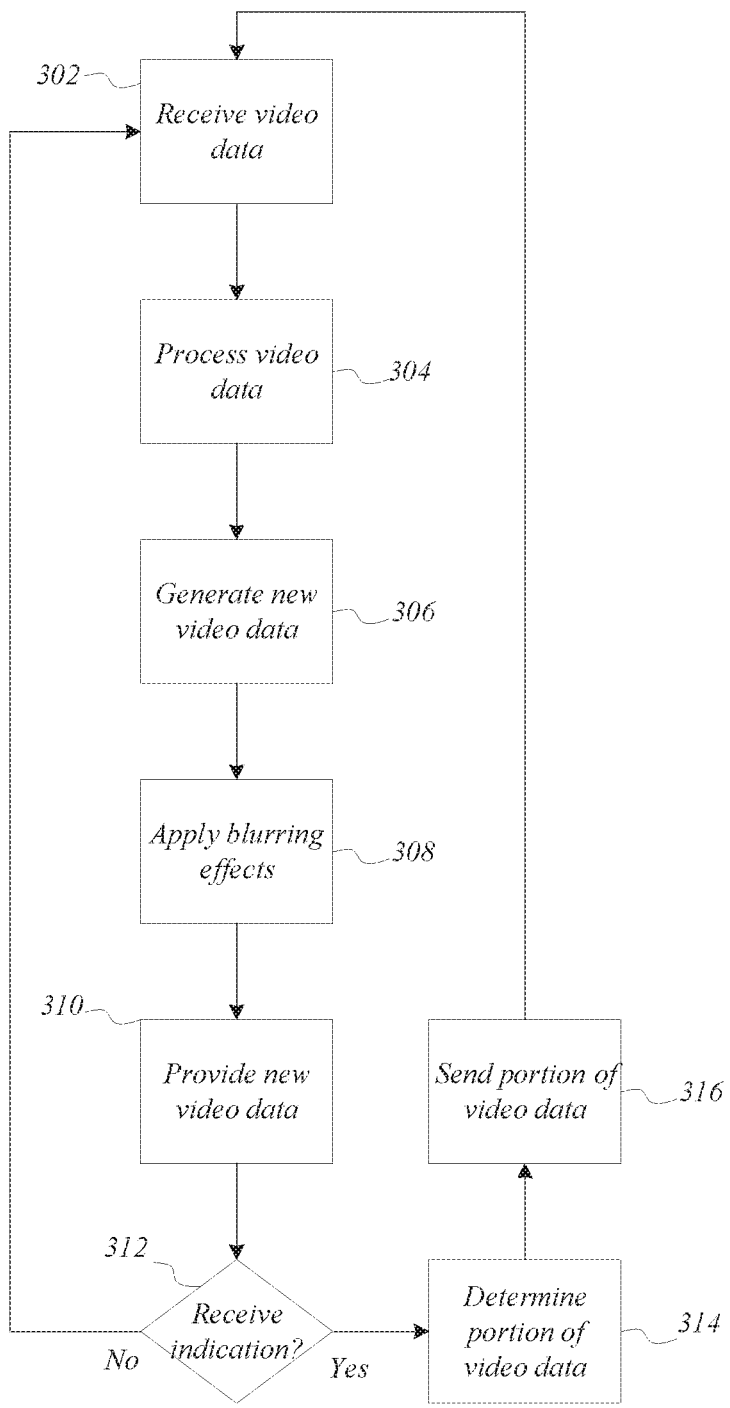
FIG. 3 illustrates an example of a first logic flow for processing video data.

FIG. 3 illustrates an example first logic flow 300 representing one or more operations as discussed herein. More specifically, logic flow 300 includes operations that may be performed by an ATM, a video processing system, and computing devices to process video data and provide the video data to end users in a secure and private manner, e.g., with applied blurring effects.

At block 302, the logic flow 300 includes receiving video data. For example, a video processing system may receive video data from an ATM camera feed, such as those found in walkup and drive-through ATMs. The video data includes one or more frames and may capture a scene of the area around the ATM.

At block 304, the logic flow 300 includes processing the video data. More specifically, the video processing system can apply one or more object and facial detection techniques to detect faces of people in a scene and objects having confidential/important information, as discussed above. Further, the video processing system may determine whether to apply blurring effects to each of the objects and/or faces detected in the video data, e.g., perform OCR detection, apply machine-learning, and modeling techniques, etc.

In embodiments, the logic flow 300 includes generating new or second video data from the received video data at block 306. In embodiments, the new or second video data may mirror the first video data. Further and at block 308, the logic flow 300 includes applying the blurring effects to objects and/or faces determined to require privacy protection to the newly generated video data. The objects blurred may include detected faces and objects determined to have confidential information detected in the received video data.

At block 310, the logic flow 300 includes providing the new or second video data to one or more computing devices. As discussed, a user may be able to access the video data on a computing device, such as a mobile device or personal computer, and watch the modified video stream with blurring applied. The video stream may be used by the user to determine whether the suspicious activity is occurring in real-time or near real-time and tag the video stream, for example.

At decision block 312, the logic flow 300 includes determining whether a tag indication is received. More specifically, the video processing system may determine whether a tag indication is received from at least one of the computing devices indicating suspicious activity is occurring. If no tag indication is received, the video processing system may continue to receive and process video data from one or more ATMs, as discussed above. However, if tag information is received at block 312, the logic flow 300 includes determining a portion of the video data indicated by the tag at block 314. For example, the video processing system may use information in the tag identifier, such as a timestamp, a frame identifier, etc. to locate a corresponding portion of the received (original) video data received from the ATM, e.g., unblurred video data received from the ATM. In one example, at least the original or received video data may be stored in a storage system with tag information, e.g., timestamps, frame numbers, etc. The video processing system may use the received tag information from the computing device to perform a lookup to locate the corresponding original video data. In some instances, the video processing system may retrieve a portion of the original video data occurring at a time prior to the received tag identifier, as it may include information relevant to the suspicious activity detected by a user.

In embodiments, the logic flow 300 includes sending/providing at least a portion of the original or received video data to an emergency services system. For example, the video processing system may send the original video and alert the police of the suspicious activity detected by at least one user of at least one computing device. Embodiments are not limited in this manner.

FIG. 4A illustrates an example of a logic flow 400 that may be representative of some or all the operations executed by one or more embodiments described herein. For example, the logic flow 400 may illustrate operations performed by a video processing system to process video data and enable detection of suspicious activity.

At block 405, embodiments include receiving first video data comprising one or more frames having a scene with a person. The first video data is received from an ATM, for example, and may be a video stream. At block 410, the logic flow 400 includes performing a facial detection process on the first video data to detect a facial region in each frame having the scene with the person. The facial detection process may include the application of one or more object detection techniques, as previously discussed.

At block 415, the logic flow 400 includes generating second video data from the first video data, the second video data to include a blurring effect applied to the facial region detected in the first video data. The blurring effect may hide the facial region detected in the first video data, for example. At block 420, the logic flow includes providing the second video data for display on one or more devices.

At block 425, the logic flow 400 includes receiving a tag indication from at least one of the one or more devices, the tag indication to indicate a portion of the second video data having suspicious activity. The tag indication may be used to determine a corresponding portion of the first video data which may be communicated to an emergency services system, as discussed.

FIG. 4B illustrates an example of a logic flow 450 that may be representative of some or all the operations executed by one or more embodiments described herein. For example, the logic flow 450 may illustrate operations performed by a video processing system to process video data and enable detection of suspicious activity.

At block 455, the logic flow 450 includes receiving video data streams from a plurality of automatic teller machines (ATMs). Further and at block 460, embodiments include detecting regions surround faces of people within each of the video data streams by performing a facial detection process on each of the video data streams.

At block 465, the logic flow 450 generating new video data streams each corresponding to one of the video data streams received from the ATMs, each of the new video data streams to include a blurring effect applied to detected regions, and at block 470 includes providing at least one of the new video data streams for display on one or more devices.

Embodiments include receiving a tag indication from at least one of the one or more devices, the tag indication to indicate a portion of one of the new video data streams having suspicious activity at block 475. Further and at block 480 the logic flow 450 includes sending a portion of a video data stream of the video data streams corresponding with the indicated portion of one of the new video data streams to an emergency services system.

Figure 5A:
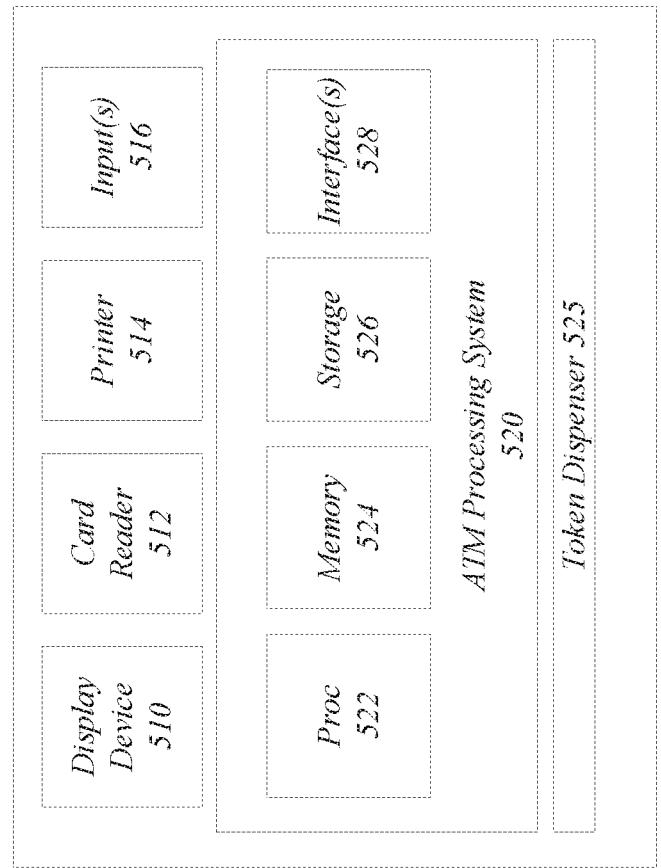
FIG. 5A illustrates an example of an automatic teller machine.

FIG. 5A illustrates an example of an ATM 502 that is consistent with embodiments discussed herein. The ATM 502 may include a number of components and devices to provide various functionality for the ATM 502 including processing video data and performing suspicious activity detection.

In embodiments, the ATM 502 includes a display device 510 capable of displaying information to a user and one or more input device(s) 516 that may enable the user to interact with the ATM 502. The display device 510 may be any type of display device including, but not limited to, a CRT display, a LCD display, a plasma display, and so forth. Further, the one or more input device(s) 516 may include a keypad to enable a user to enter information corresponding to a transaction, e.g., a security token (pin). The keypad may include numbers and additional keys, such as "ENTER", "CANCEL", and so forth.

In some embodiments, the one or more input device(s) 516 may include a camera to capture video/image information, a microphone to capture audio information, and one or more biometric sensors. For example, the camera may capture video data that may be provided to a video processing system. Moreover, the camera may capture video data in any number of forms and/or include circuitry to convert raw video (pixel) data into processed (lossy or lossless compression) data capable of being sent to another system, such as a video processing system.

In embodiments, the ATM 502 includes a card reader 512 that can read a credit card or debit card. The card reader 512 may include circuitry to read a magnetic strip on a side (back or front) of the card and/or a chip embedded in the card. Embodiments are not limited in this manner. Further, the ATM 502 includes a printer 514 capable of printing receipts.

In embodiments, the ATM 502 includes an ATM processing system 520 including a processor 522, memory 524, storage 526, and one or more interface(s) 528. The processor 522 may be any type of processing device capable of processing information and data, such as a central processor unit (CPU), processing circuitry, and so forth capable of processing software, information, and data to perform one or more operations discussed herein.

The memory 524 may be volatile and/or non-volatile memory capable of storing information during execution of instructions and/or in a persistent manner when power is not applied to the 502. For example, the memory 524 may include read-only (or programmable) read-only memory capable of storing instructions that when executed by the processor 522 cause one or more operations as discussed herein. The ATM 502 may also include a storage device 526, such as a hard drive (HDD), a tape drive, and so forth also capable of storing information in a persistent manner.

The ATM processing system 520 also includes one or more interface(s) 528 that are capable of interfacing with one or more other system, such as a video processing system. These interfaces may couple to a local area network (LAN), a wide area network (WAN), and/or provide a dial-up connection capability. For example, the interfaces 528 can include a wired and/or wireless networking interface having a high bandwidth network connection to allow for efficient and rapid communication of information and data and may use the TCP/IP transfer protocol. In another example, the interfaces 528 may include a dial-up modem to communicate via dial-up connection. Further, the ATM 502 also includes a token dispenser 525 capable of dispensing monetary tokens, e.g., cash.

Figure 5B:
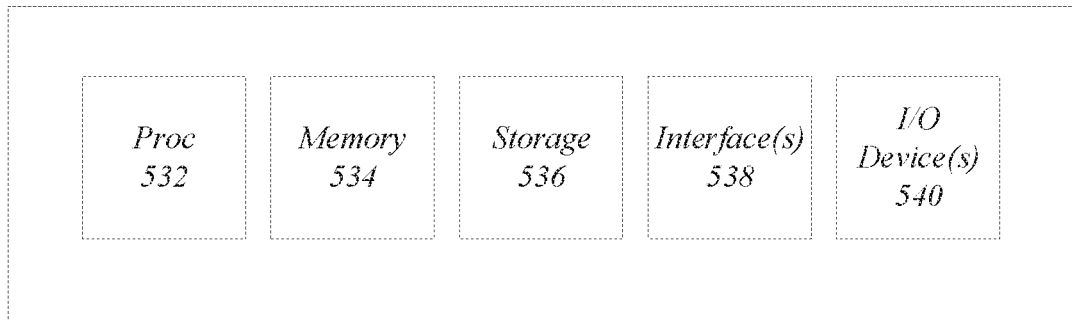
FIG. 5B illustrates an example of an emergency services system.
Figure 5C:
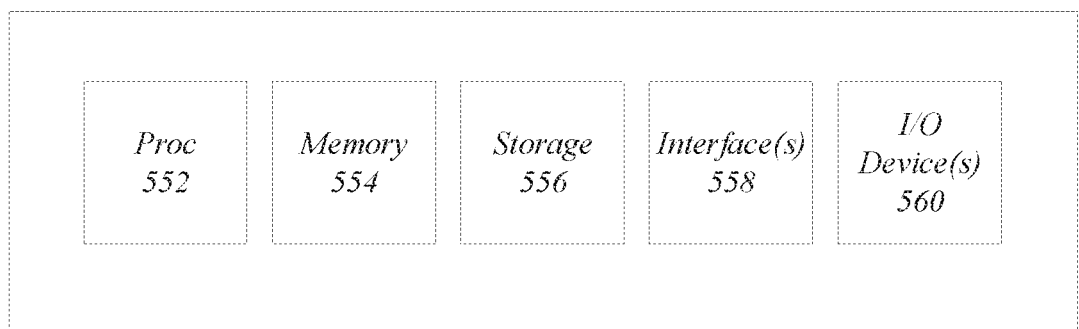
FIG. 5C illustrates an example of a video processing system.

FIG. 5B/FIG. 5C illustrates examples of a emergency services system 530 and a video processing system 550, respectively. The video processing system 550 of FIG. 5C includes a number of components that may perform one or more operations as discussed herein. The video processing system 550 includes one or more processors 552 (circuitry), memory 554, storage 556, one or more interface(s) 558, and one or more input/output (I/O) device(s) 560.

In embodiments, the video processing system 550 may be a processing system that includes one or more servers or computing devices that are interconnected via one or more network links, e.g., wired, wireless, fiber, etc. In some instances, the video processing system 550 may be a distributed computing system. Each of the servers may include one or more processor(s) 552, which may include one or more processing cores to process information and data including video data to generate new video data. Moreover, the one or more processors 552 can include one or more processing devices, such as a microprocessor manufactured by Intel™ AMD™, or any of various processors. The disclosed embodiments are not limited to any type of processor(s).

Memory 554 can include one or more memory (volatile or non-volatile) devices configured to store instructions used by the one or more processors 552 to perform one or more operations consistent with the disclosed embodiments. For example, memory 554 can be configured with one or more software instructions, such as programs that can perform one or more operations when executed by the one or more processors 552.

The disclosed embodiments are not limited to separate programs or computers configured to perform dedicated tasks. For example, memory 554 can include a single program that performs the operations or could comprise multiple programs.

In embodiments, the video processing system 550 may include one or more storage devices 556. The storage devices 556 may include HDDs, flash memory devices, optical storage devices, floppy storage devices, etc. In some instances, the storage devices 556 may include cloud-based storage devices that may be accessed via a network interface. In some embodiments, the storage 556 may be configured to store one or more databases and/or as a distributed database system to store information and data. Databases can include one or more memory devices that store information and are accessed and/or managed through the video processing system 550. By way of example, databases can include Oracle™ databases, Sybase™ databases, or other relational databases or non-relational databases, such as Hadoop sequence files, HBase, or Cassandra. The databases or other files can include, for example, data and information related to the source and destination of a network request, the data contained in the request, transaction information, etc. Systems and methods of disclosed embodiments, however, are not limited to separate databases. In one aspect, video processing system can include databases located remotely from other video processing system 550 devices. The databases can include computing components (e.g., database management system, database server, etc.) configured to receive and process requests for data stored in memory devices of databases and to provide data from databases.

The video processing system 550 includes one or more interfaces 558. The one or more interfaces 558 can include one or more digital and/or analog communication devices that allow the vide processing system 550 to communicate with other machines and devices, such one or more ATMs and emergency services systems. The one or more interfaces 558 can communicate via any type of connection, e.g., wired, wireless, optical, and so forth. These interfaces 558 may include network adapters and/or modems to communicate with the ATMs and the emergency services system 530. Embodiments are not limited in this manner.

The video processing system 550 may also include one or more I/O devices 560, such as a mouse, keyboard, camera, microphone, etc. Other I/O devices may include USB devices, CD/DVD/Blu-ray devices, SD card devices, display devices, and so forth.

In embodiments, the video processing system 550 may include other components and processing circuitry to perform operations discussed herein. For example, the video processing system 550 may include a graphics processing unit (GPU) other specialty graphics processing engine to perform the operations discussed herein, e.g., objection detection, image/video blurring, generating new video data, and so forth. Embodiments are to not limited in this manner.

As mentioned, FIG. 5B illustrates an example of a emergency services system 530. In embodiments, the emergency services system 530 of FIG. 5B includes similar devices as the video processing system 550. Similarly, the emergency services system 530 includes one or more processor(s) 532, memory 534, storage 536, one or more interface(s) 538, and one or more I/O device(s) 540. Moreover, the emergency services 530 may be a processing system that includes one or more servers or computing devices that are interconnected via one or more networking links, e.g., wired, wireless, fiber, etc. and is capable of processing information and data from the transaction services system and ATMs. In some instances, the emergency services system 530 may also be a distributed computing system. Each of the servers may include one or more processor(s) 532, which may include one or more processing cores to process information and data. The emergency services system 530 also includes memory 534, which may be similar to and/or the same as memory 554. Memory 534 can include one or more memory (volatile or non-volatile) devices configured to store instructions used by the one or more processors 532 to perform one or more operations consistent with the disclosed embodiments.

In embodiments, the emergency services system 530 may include one or more storage devices 536. The storage devices 536 may include HDDs, flash memory devices, optical storage devices, floppy storage devices, etc. In some instances, the storage devices 536 may include cloud-based storage devices that may be accessed via a network interface. In some embodiments, the storage 536 may be configured to store one or more databases and/or as a distributed database system to store information and data.

The emergency services system 530 includes one or more interfaces 538. The one or more interfaces 538 can include one or more digital and/or analog communication devices that allow the emergency services system 530 communicate with other machines and devices, such one or more ATMs and the video processing system. The one or more interfaces 538 are capable of communicating via any type of connection, e.g., wired, wireless, optical, and so forth. These interfaces 538 may include network adapters and/or modems to communicate with the ATMs and the video processing systems. Embodiments are not limited in this manner.

The emergency services system 530 may also include one or more I/O devices 540, such as a mouse, keyboard, camera, microphone, etc. Other I/O devices may include USB devices, CD/DVD/Blu-ray devices, SD card devices, display devices, and so forth. These devices enable a user or device to communicate with the emergency services system 530. Embodiments are not limited in this manner.

Figure 6:
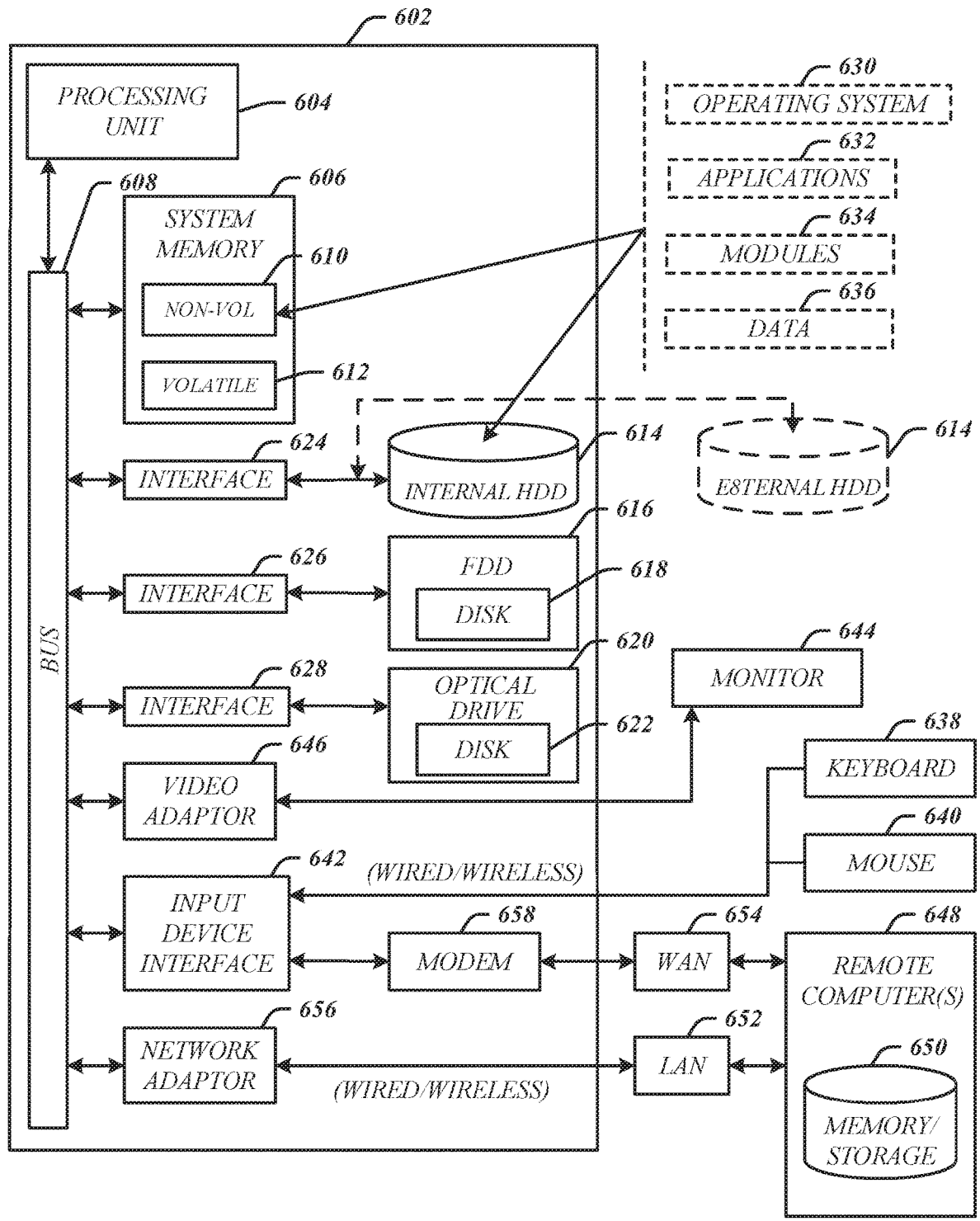
FIG. 6 illustrates an example of a computing architecture.

FIG. 6 illustrates an embodiment of an exemplary computing architecture 600 suitable for implementing various embodiments as previously described. In one embodiment, the computing architecture 600 may include or be implemented as part of financial system 100.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 includes a processing unit 604, a system memory 606 and a system bus 608. The processing unit 604 can be any of various commercially available processors.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 700.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 604 through an input device interface 642 that is coupled to the system bus 608 but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 602 family of standards, such as wireless devices operatively disposed in wireless communication (e.g., IEEE 602.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 602.118 (a, b, g, n, etc.) to provide secure, reliable, fast wireless connectivity. A Wi-Fi network can be used to connect computers to each other, to the Internet, and to wire networks (which use IEEE 602.3-related media and functions).

The various elements of the devices as previously described with reference to FIGS. 1-5C may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 7:
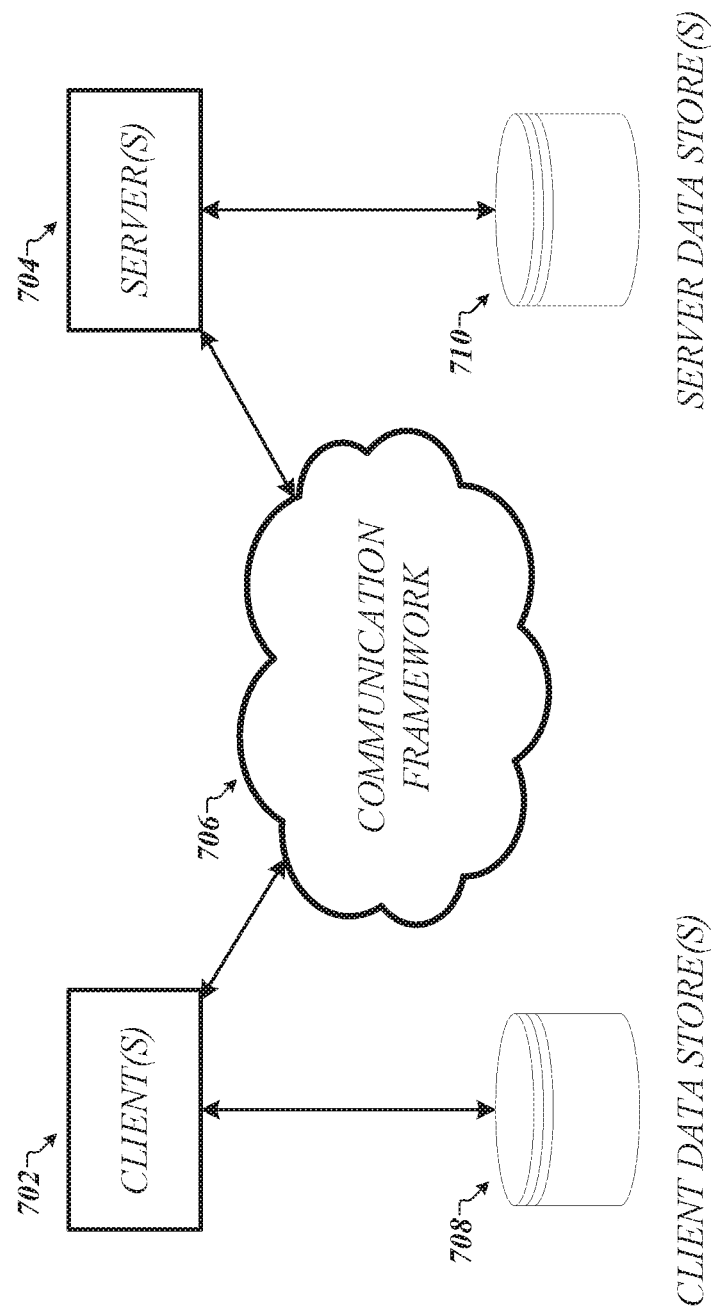
FIG. 7 illustrates an example of a communications architecture.

FIG. 7 is a block diagram depicting an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700, which may be consistent with system 100.

As shown in FIG. 7, the communications architecture 700 includes one or more clients 702 and servers 704. The servers 704 may implement the server device 526. The clients 702 and the servers 704 are operatively connected to one or more respective client data stores 706 and server data stores 707 that can be employed to store information local to the respective clients 702 and servers 704, such as cookies and/or associated contextual information.

The clients 702 and the servers 704 may communicate information between each other using a communication framework 710. The communications framework 710 may implement any well-known communications techniques and protocols. The communications framework 710 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 710 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 702.7a-x network interfaces, IEEE 702.16 network interfaces, IEEE 702.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Figure 8:
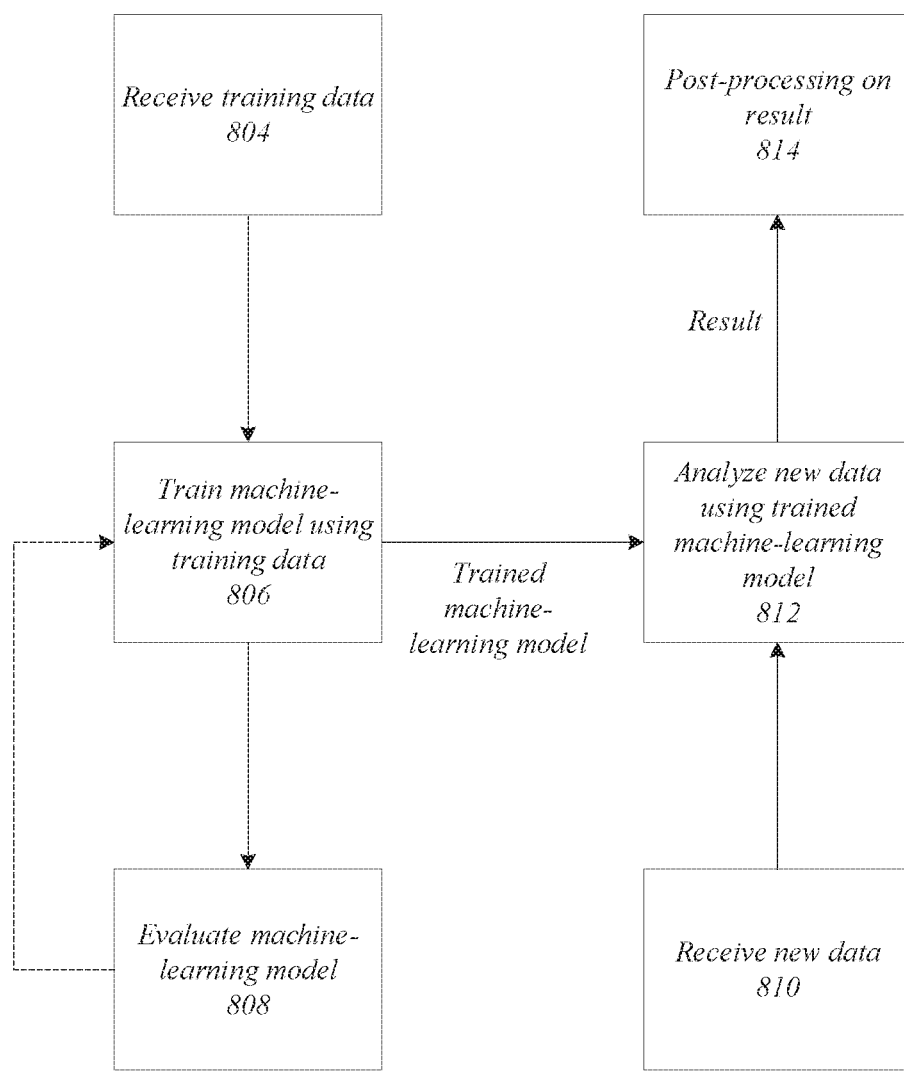
FIG. 8 illustrates an example of a processing flow.

FIG. 8 is a flow chart of an example of a process 800 for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 8.

In block 804, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model. In embodiments, the training data may include historical data to determine and/or provide context for the text in a video stream. For example, the historical data may include video/text data associated with a particular area or location of a camera and a text for a general population. In one specific example, a model may be trained to determine 'safe' text for a locale based on video data taken from the camera at that locale. The camera may capture text that is persistent in the area, e.g., text associated with ads. In another example, a model may be trained on text that is generally related to advertisements and/or other material deemed to be safe. These models may be used by the video processing system to determine text not to blur. In other instances, models may be trained to determine text that should be blurred, e.g., credit/debit card numbers, social security numbers, legal text, etc. Embodiments are not limited in this manner.

In block 806, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model must find structure in the inputs on its own. In semi-supervised training, only some of the inputs in the training data are correlated to desired outputs.

In block 808, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, e.g., the current transaction information, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 806, where the machine-learning model can be further trained using additional training data or otherwise modified to improve accuracy. If the machine-learning model has an adequate degree of accuracy for the particular task, the process can continue to block 810.

In block 810, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 812, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 814, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a memory to store instructions; and
   processing circuitry, coupled with the memory, operable to execute the instructions, that when executed, cause the processing circuitry to:
   receive first video data from an automatic teller machine (ATM), the first video data comprising one or more frames having a scene with a person;
   perform a facial detection process on the first video data to detect a facial region in each frame having the scene with the person;
   generate second video data separate from the first video data, the second video data to be generated from the first video data and include a blurring effect applied to the facial region detected in the first video data;
   provide the second video data for display on one or more other devices, wherein the second video data is sent to the one or more other devices based on the one or more other devices located within a predefined distance of the ATM;

receive a plurality of tag indications from a subset of the one or more other devices, each of the plurality of tag indications to indicate a portion of the second video data having suspicious activity;

determine a number of the plurality of tag indications is greater than a threshold value; and send a portion of the first video data corresponding with the portion of the second video data indicated by the tag indications to one or more servers associated with an emergency services system, wherein the portion of the first video data does not have the blurring effect applied to the facial region in the first video data.

2. The apparatus of claim 1, wherein the portion of the first video starts at a time prior to receiving the tag indication and ends at a specified time from a time the tag indication is received.

3. The apparatus of claim 1, the processing circuitry to provide the second video data for display on the one or more devices within a defined distance from a location of the ATM.

4. The apparatus of claim 1, the processing circuitry to provide the second video data to the one or more devices via at least one of a web portal, a mobile application, and a desktop application.

5. The apparatus of claim 1, comprising:

an interface coupled with one or more network links to receive the first video data from an ATM; and a storage to store the first video data and the second video data.

6. A computer-implemented method, comprising:

receiving, via one or more networking links, original video data from an ATM, the original video data comprising one or more frames having a scene with a person;

performing, by processing circuitry, a facial detection process on the original video data to detect a region surrounding a face of a person in each frame having the scene with the person;

generating, by the processing circuitry, new video data separate from the original video data by replicating the video data and applying a blurring effect to the region surrounding the face of the person detected in the video data;

sending, by the processing circuitry via the one or more networking links, the new video data to one or more other devices, wherein the new video data is sent to the one or more other devices based on the location of the one or more other devices located within a predefined distance of the ATM;

receiving, by the processing circuitry via the one or more network links, one or more tag indications from at least one of the one or more other devices, the one or more tag indications to comprise at least one of a timestamp and a frame indicator and to indicate a portion of the new video data having suspicious activity;

determining, by the processing circuitry, a number of the one or more tag indications greater or equal to a threshold value; and sending, via the networking links, a portion of the original video data corresponding with the portion of the new video data indicated by the one or more tag indications to at least one server of an emergency services system based on the number of the one or more tag indications greater or equal to a threshold value.

7. The computer-implemented method of claim 6, wherein the portion of the video data does not have the blurring effect applied to the region surrounding the face of the person in the video data.

8. The computer-implemented method of claim 6, comprising providing the new video data for display on the one or more devices within a defined distance from a location of the ATM.

9. The computer-implemented method of claim 6, comprising providing the new video data to the one or more devices via at least one of a web portal, a mobile application, and a desktop application.

10. A computer-readable storage medium storing computer-readable program code executable by a processor to:

receive original video data streams from a plurality of automatic teller machines (ATMs);

detect regions surround faces of people within each of the original video data streams by performing a facial detection process on each of the video data streams;

generate new video data streams each corresponding to one of the original video data streams received from the ATMs, each of the new video data streams to include a blurring effect applied to detected regions, wherein the blurring effect is to be applied in accordance with at least one machine learning technique;

provide at least one of the new video data streams for display on one or more other devices, wherein the at least one of the new video data streams provided to other devices within predefined distances of the ATMs;

receive tag indications from at least one of the one or more other devices, the tag indications to comprise at least one of a timestamp and a frame indicator and to indicate a portion of one of the new video data streams having suspicious activity;

determine a number of tag indications corresponding to one of the new video data streams is greater than a threshold value; and send a portion of a video data stream of the original video data streams corresponding with the portion of the one of the new video data streams indicated by the tag indications greater than the threshold value to an emergency services system.

11. The computer-readable storage medium of claim 10, wherein the portion of the first video data stream does not have the blurring effect applied.

12. The computer-readable storage medium of claim 10, wherein each of the ATMs is in a different location, and the new video data streams are each provided to devices within defined distances from the locations of the ATMs.

13. The apparatus of claim 1, wherein the tag indication comprises at least one of a timestamp and a frame identifier.

14. The apparatus of claim 1, wherein the blurring effect is to be applied in accordance with at least one machine learning technique.

15. The apparatus of claim 6, wherein the blurring effect is to be applied in accordance with at least one machine learning technique.

* * * * *